(12) United States Patent
Ikunami

(10) Patent No.: US 8,059,215 B2
(45) Date of Patent: Nov. 15, 2011

(54) DISPLAY OPENING AND CLOSING ANGLE DETECTING MECHANISM

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 944 days.

(21) Appl. No.: 11/990,497

(22) PCT Filed: May 17, 2006

(86) PCT No.: PCT/JP2006/309846
§ 371 (c)(1),
(2), (4) Date: Feb. 15, 2008

(87) PCT Pub. No.: WO2007/034594
PCT Pub. Date: Mar. 29, 2007

(65) Prior Publication Data
US 2009/0251624 A1    Oct. 8, 2009

(30) Foreign Application Priority Data
Sep. 21, 2005 (JP) .................................. 2005-274437

(51) Int. Cl.
*H04N 5/64* (2006.01)
(52) U.S. Cl. ..................... 348/837; 348/148; 361/679.01
(58) Field of Classification Search ............... 200/61.62, 200/61.7, 61.76, 61.81, 61.82; 361/679.01, 361/679.02, 679.06, 679.07
See application file for complete search history.

(56) References Cited

U.S. PATENT DOCUMENTS

| | | | | |
|---|---|---|---|---|
| 5,096,271 A | * | 3/1992 | Portman | 312/7.2 |
| 5,583,735 A | * | 12/1996 | Pease et al. | 361/170 |
| 6,256,078 B1 | * | 7/2001 | Ogata | 349/58 |
| 6,529,123 B1 | | 3/2003 | Paul, Jr. | |
| 7,021,728 B2 | * | 4/2006 | Donovan et al. | 312/7.2 |
| 7,280,166 B2 | * | 10/2007 | Nagata et al. | 348/837 |
| 7,441,738 B2 | * | 10/2008 | Kim | 248/292.12 |
| 7,591,045 B2 | * | 9/2009 | Yang | 16/286 |
| 2002/0021279 A1 | | 2/2002 | Nakasuna | |
| 2003/0169158 A1 | | 9/2003 | Paul, Jr. | |
| 2011/0090411 A1 | * | 4/2011 | Finneman | 348/837 |

FOREIGN PATENT DOCUMENTS

| | | | |
|---|---|---|---|
| CA | 2359827 | * | 5/2002 |
| DE | 102 26 405 C1 | | 7/2003 |
| DE | 102 26 453 C1 | | 10/2003 |
| DE | 2006 000 764 T5 | | 3/2006 |
| JP | 11-83416 A | | 3/1999 |
| JP | 11083416 A | * | 3/1999 |
| JP | 11-310087 A | | 11/1999 |
| JP | 11-342798 A | | 12/1999 |
| JP | 3008437 B2 | | 12/1999 |
| JP | 2002-204409 A | | 7/2002 |
| JP | 20020-193045 A | | 7/2002 |
| JP | 2003-337542 A | | 11/2003 |
| JP | 2005-14847 A | | 1/2005 |

\* cited by examiner

*Primary Examiner* — David Dunn
*Assistant Examiner* — Adam Barlow
(74) *Attorney, Agent, or Firm* — Birch, Stewart, Kolasch & Birch, LLP

(57) ABSTRACT

A display opening and closing angle detecting mechanism includes a display 1 mounted on a ceiling of a vehicle, and rotating with a rotating shaft 3 as the fulcrum integrally with the rotating shaft in an opening or closing direction; a supporting means 4 supporting the rotating shaft 3; a means 18 causing the supporting means to displace the rotating shaft vertically according to the rotation of the display; a rotor displaced up and down and rotating, integrally with the rotating shaft; a lever 9 pressed and moved by a projecting and recessed part at a plurality of rotation positions of the rotor; and a switch 14 operating according to the operation of the lever.

3 Claims, 7 Drawing Sheets

FRONT OF VEHICLE

FRONT OF VEHICLE (a)

FRONT OF VEHICLE (b)

(a)

FRONT OF VEHICLE (b)

(a)

(b)

(a)

WIEWABLE AMGLE
θ =120° OR MORE (b)

DISPLAY OPENING AND CLOSING ANGLE DETECTING MECHANISM

TECHNICAL FIELD

The present invention relates to a display opening and closing angle detecting mechanism detecting the opening and closing angle of a display, to control the display, mounted on a ceiling of a vehicle, for example, and capable of performing opening and closing operations such that the display is opened when it is used and the display is closed when it is stored.

BACKGROUND ART

Known structures include a structure where a video display serving as a display means is openably and closably attached on a ceiling of a vehicle (for example, see Patent Document 1). Such a conventional technology uses a supporting structure where a rectangular display is connected to a housing through a hinge, and is supported rotatably about a fixed fulcrum. When the display is stored, it is maintained in the closed state where the screen thereof is placed alongside the ceiling, and when the display is used, it is maintained in a so-called opened state where the screen is displaced nearly to a substantially vertical state such that a viewer can easily see the screen. In such a viewable state, since the display occupies a space corresponding to the substantially longitudinal size of the display downwardly from its fixed fulcrum, driver's rearward visibility through a room mirror is blocked in the case where a large-sized display is used, or in a sporty vehicle with a low ceiling and sunroof-specification vehicle.

Further, in an on-vehicle AV device mounted on a ceiling part of a vehicle and having a function capable of tilting its monitor unit, there has been known a supporting mechanism of an on-vehicle AV device, including a drive means having a tilt drive mechanism for tilting its monitor; a position-detecting switch detecting whether or not the monitor is located at the stored position; and a control means controlling the drive means on the basis of a signal from the position-detecting switch (for example, see Patent Document 2).

In the aforementioned technologies, there is no disclosure indicating that the rotating shaft of the monitor is displaced. Furthermore, the technology discloses only a structure for detecting the stored position of the monitor (that is, when the monitor is located in the closed state); however, the technology does not disclose that, for example, with an apparatus having a function causing the monitor to displace the rotating shaft while making an opening movement, any opening angle of the monitor is detected. For this reason, for instance, when the monitor is opened wider than a viewable angle and the display comes into the sight of a driver, no safety measures such as turning off of the display of the monitor can be taken. Even if an arrangement is adopted such that the monitor is locked against a further rotating movement so as to be unable to open wider than a predetermined viewable angle, it still remains that the shock given to a person coming in contact with the monitor cannot be reduced.

Patent Document 1: JP-A2002-193045
Patent Document 2: JP-A2002-204409

In conventional on-vehicle display units, the rearward visibility of a driver through a room mirror is sometimes blocked as the display size increases or due to other reasons. Moreover, if the display is opened wider than a viewable angle by some reasons and therefore, the display comes within the sight of the driver, safety measures cannot be taken such as automatically turning off the display because there is no detecting means for detecting that the display is opened wider than the viewable angle.

The present invention has been made to solve the above-mentioned problems. An object of the present invention is to provide a display opening and closing angle detecting mechanism capable of reducing a disincentive acting on a driver to concentrating attention during driving, accompanied by installation of a display.

DISCLOSURE OF THE INVENTION

The display opening and closing angle detecting mechanism according to the present invention includes a display mounted on a ceiling of a vehicle, and rotating in an opening or closing direction with a rotating shaft as a fulcrum integrally with the rotating shaft; a supporting means for supporting the rotating shaft; a rotating shaft moving means for causing the supporting means to displace the rotating shaft vertically according to the rotation of the display; a rotor having a projecting and recessed part that is displaced vertically and rotates, integrally with the rotating shaft; a lever pressed and moved at a plurality of rotation positions of the rotor by the projecting and recessed part; and a switch operating according to the movement of the lever to obtain a signal for controlling the display.

The present invention is able to provide a display opening and closing angle detecting mechanism capable of reducing a disincentive, accompanied by installation of a display, acting on a driver to the concentration of attention on driving.

BEST MODE FOR CARRYING OUT THE INVENTION

An embodiment of the present invention will now be described with reference to the accompanying drawings in order to explain the present invention in more detail. It should

FIRST EMBODIMENT

In FIG. 1 to FIG. 3, and FIG. 4(a), a display 1 has the shape of a rectangular plate, and can rotate with a rotating shaft 3 formed integral with the display 1 as a fulcrum. The rotating shaft 3 is supported by a rotating shaft holder 4 serving as a supporting means. The rotating shaft 3 projects coaxially from one end of the display 1, and the supporting structure thereof on each of the backsides vertical to the spaces of the figures is similar to the supporting structure on the shown side. The rotating shaft holder 4 is fixed on a base plate 16 secured on the ceiling of a vehicle.

Figure 1:
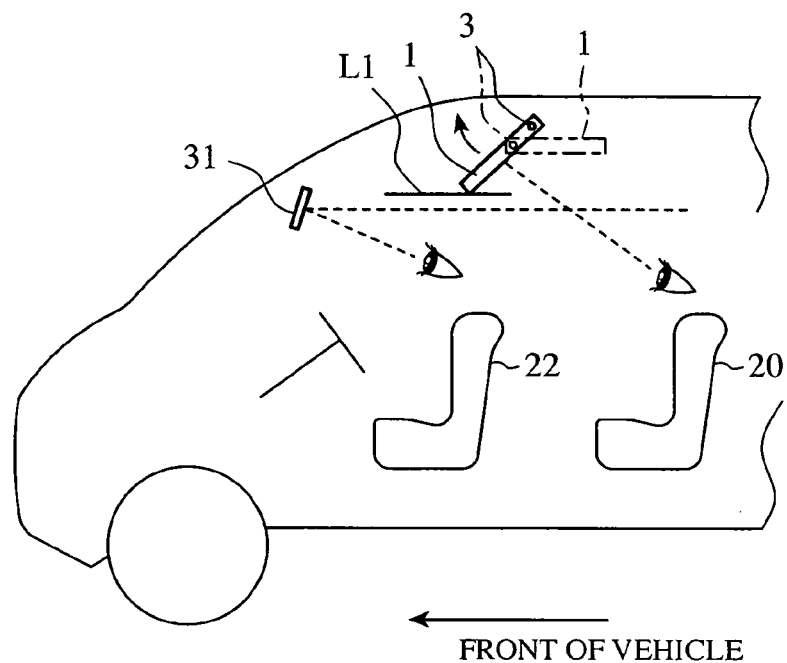
FIG. 1 is a view explaining an opened/closed state of a display disposed on a ceiling of a vehicle.
Figure 2:
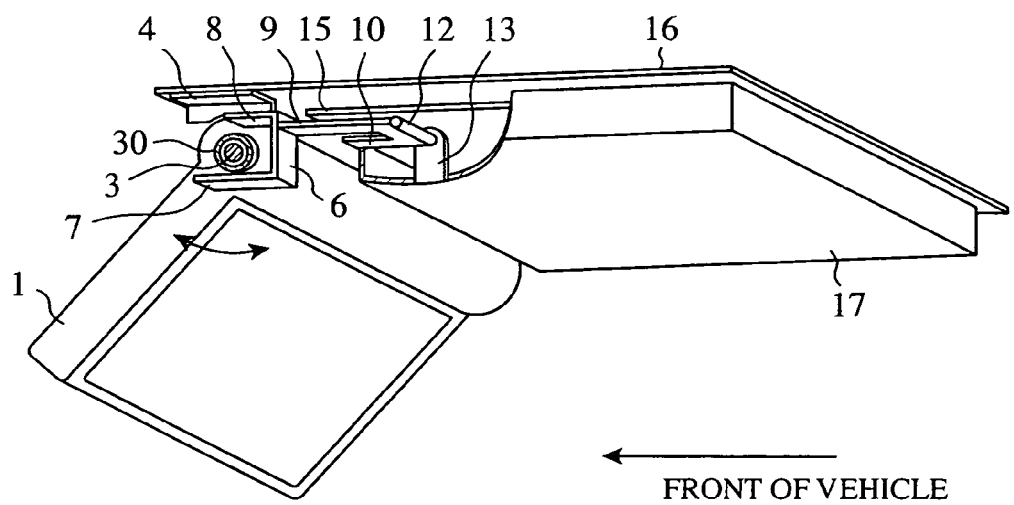
FIG. 2 is an oblique view of a display unit.
Figure 3:
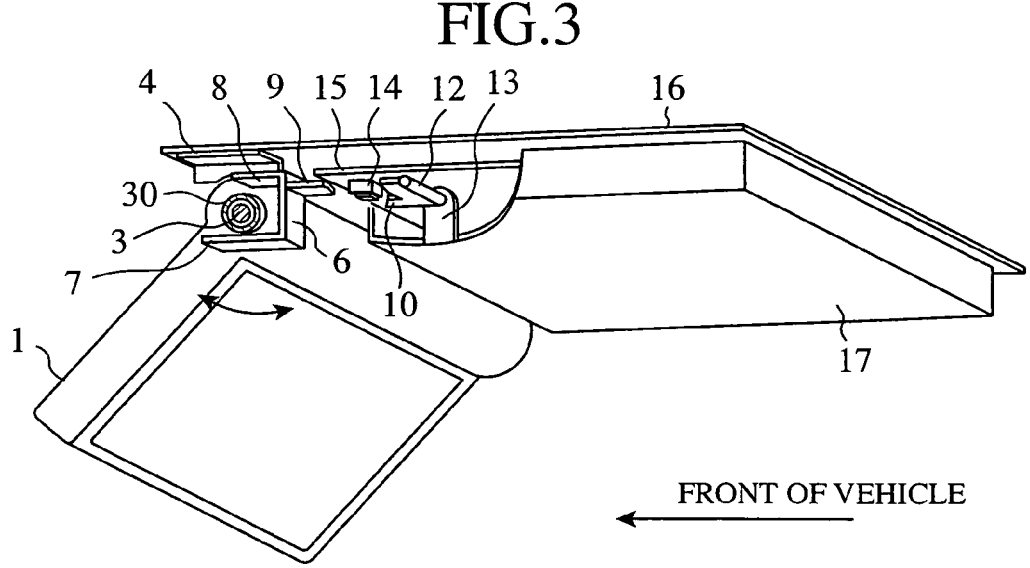
FIG. 3 is an oblique view of the display unit.

The display 1 shown in full lines in FIG. 1 to FIG. 3 is in an opened state where the display is opened, and the display assumes a position where the screen thereof is hung at an angle with respect to a vertical plane. When storing the display, a user puts his or her hand on the lower end of the display 1 to draw the display to rearward of the vehicle, and then draws up the display. In such a way, the display 1 rotates about the rotating shaft 3, and the rotating shaft 3 is upwardly displaced by a rotating shaft moving means 18 (described later) displacing the rotating shaft 3 in an obliquely vertical direction to the rotating shaft holder 4 according to the rotation of the display 1, thus finally bringing the display 1 to the closed state where the display is nearly parallel to the base plate 16 as shown in dash-double-dot lines in FIG. 1 and further in FIG. 4. That closed state is the state where the display is stored.

Referring to FIG. 1, a viewer sitting on a rear seat 20 can view the display 1 well under the opened state of the display 1 shown in the full line. Meanwhile, when a driver sitting on a driver seat 22 located forward confirms the backward conditions through a room mirror 31, the level L1 of the lower end of the display 1 has been withdrawn to the position where the lower end does not obstruct the driver's view.

In FIG. 1, from the time when the display is in the opened state to the time when the display 1 is in the closed state, the position of the rotating shaft 3 is displaced in an inclined direction to a obliquely-vertical direction. Such a displacement of the rotating shaft 3 is performed by the rotating shaft moving means 18 having a mechanism incorporating a rack 23 and a pinion 24 which are provided in the part where the rotating shaft 3 and the rotating shaft holder 4 are coupled.

Figure 4:
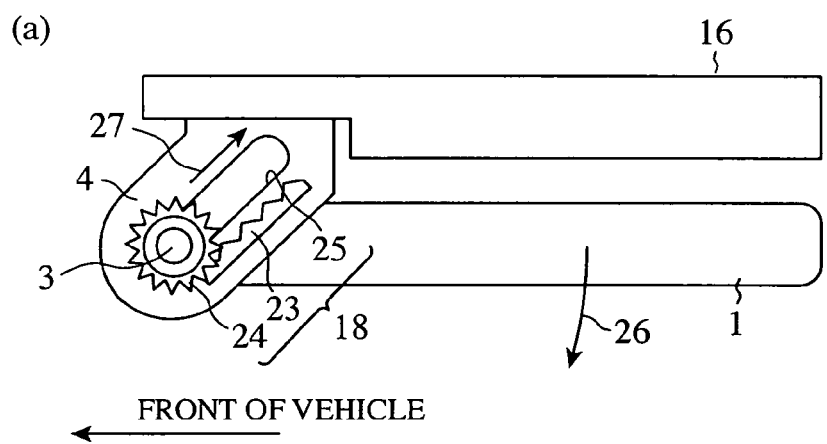
FIG. 4(a) is a schematic front view of a display and a rotating shaft moving means in a stored state.
FIG. 4(b) is a schematic front view of the display and members operating a switch in the stored state.
Figure 4:
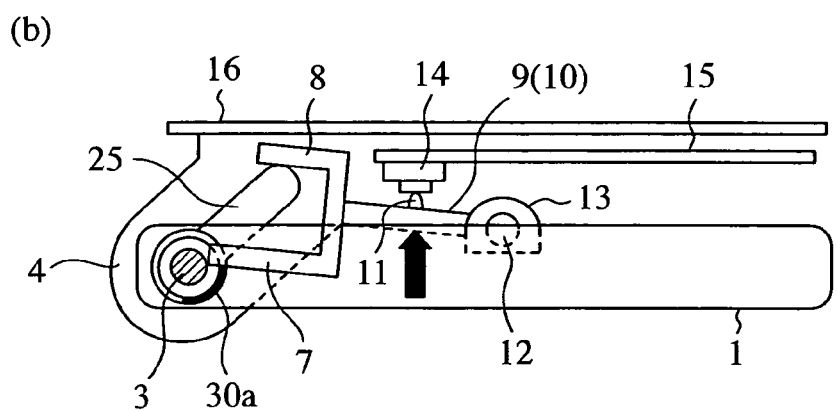

The rotating shaft moving means 18 will be described with reference to FIG. 4. The pinion 24 is fixed integrally around the rotating shaft 3. A guide slot 25 made of a long groove in an obliquely vertical direction is formed through the rotating shaft holder 4. The rotating shaft 3 is engaged rotatably through and movably along the guide slot 25. In this way, the guide slot 25 limits the direction where the rotating shaft 3 is displaced to the obliquely vertical direction. Further, the rack 23 meshing with the pinion 24 is secured parallel to the guide slot 25 on the rotating shaft holder 4.

The pinion 24, guide slot 25, rack 23, and so on are included in the mechanism as the main structural members constituting the rotating shaft moving means 18. With this arrangement, the rotating shaft moving means 18, when the display 1 is rotated from the closed state to the opened state, is able to displace the rotating shaft 3 so that the display-screen of the display can move a predetermined distance in an upward direction as seen from the viewer. Moreover, the rotating shaft moving means can return the display to the closed state by the opposite operation.

Figure 5:
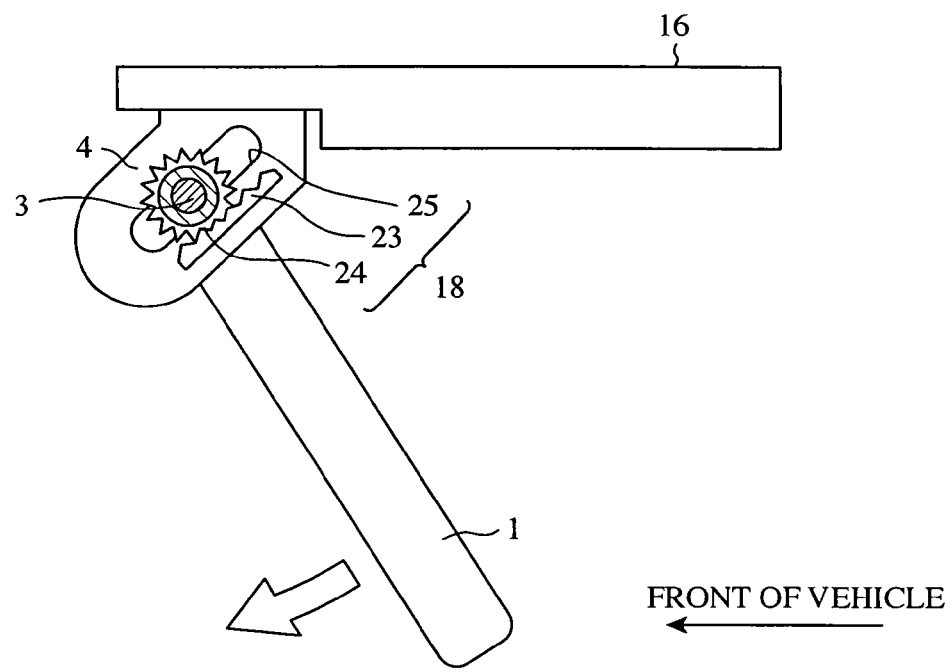
FIG. 5(a) is a schematic front view of the display and the rotating shaft moving means in an opening operation.
FIG. 5(b) is a schematic front view of the display and the members operating the switch in an opening operation.
Figure 5:
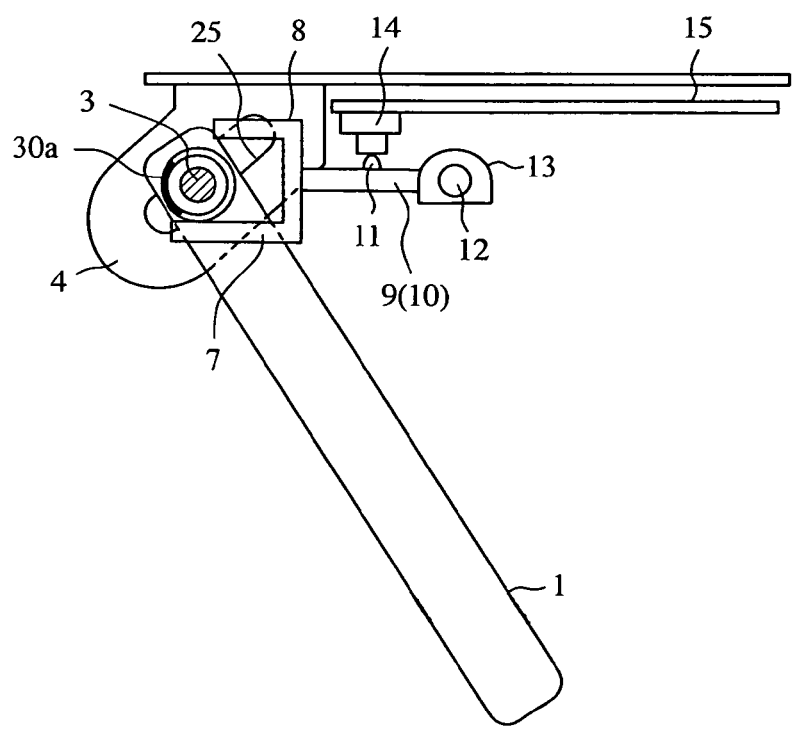

The operation of the detecting mechanism will be described. When the display 1 is in the closed state as shown in FIG. 4(a) and further, as shown in the dash-double-dot line in FIG. 1, rotating the display 1 in a clockwise direction as shown by arrow 26 rotates also the pinion 24 integrally with the rotating shaft 3 in the same direction, and at the same time, transmits the rotating force to the rack 23. This displaces the rotating shaft 3 in an obliquely upward direction as shown by arrow 27 because the rotating shaft 3 is limited in the moving direction by the guide slot 25. The movement in progress of the display that is being displaced is shown in FIG. 5(a).

Figure 6:
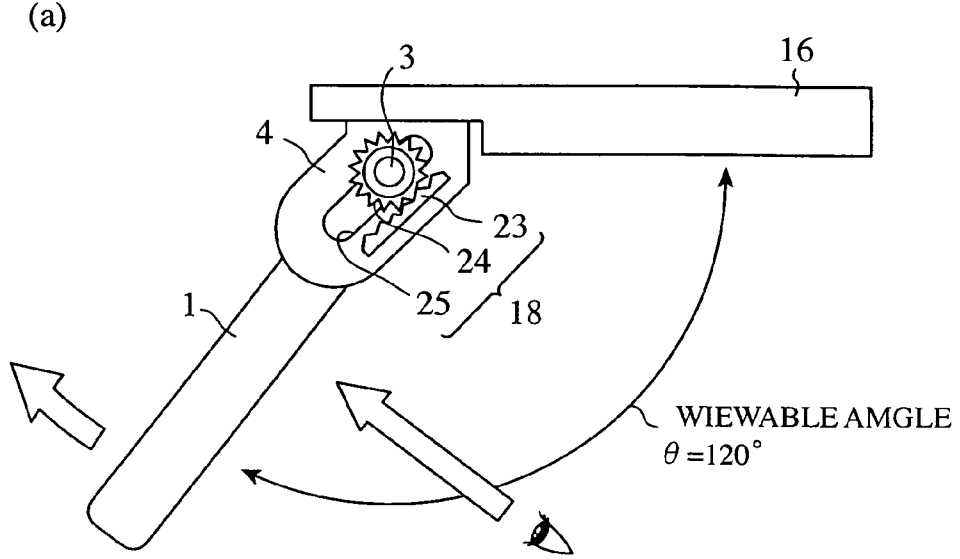
FIG. 6(a) is a schematic front view of the display and the rotating shaft moving means in a viewable state.
FIG. 6(b) is a schematic front view of the display and the members operating the switch in the viewable state.
Figure 6:
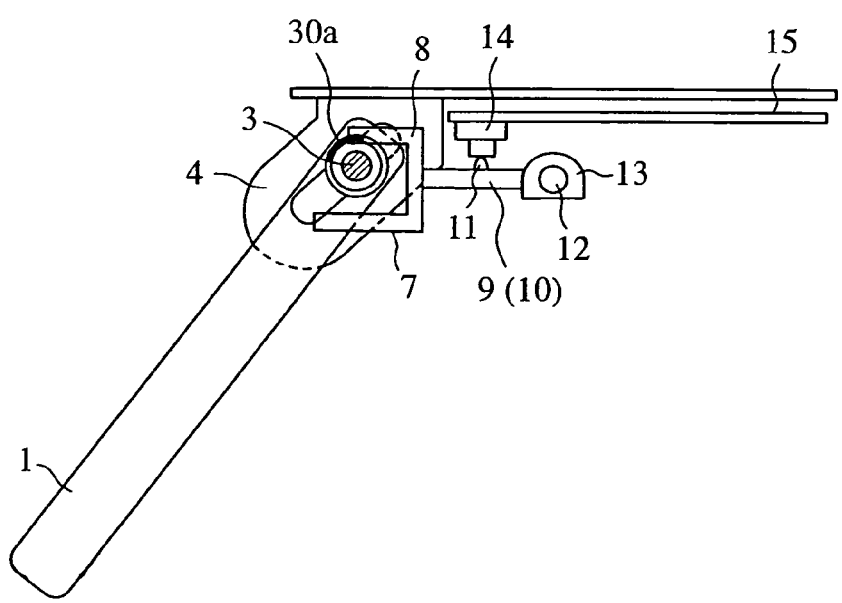
Figure 7:
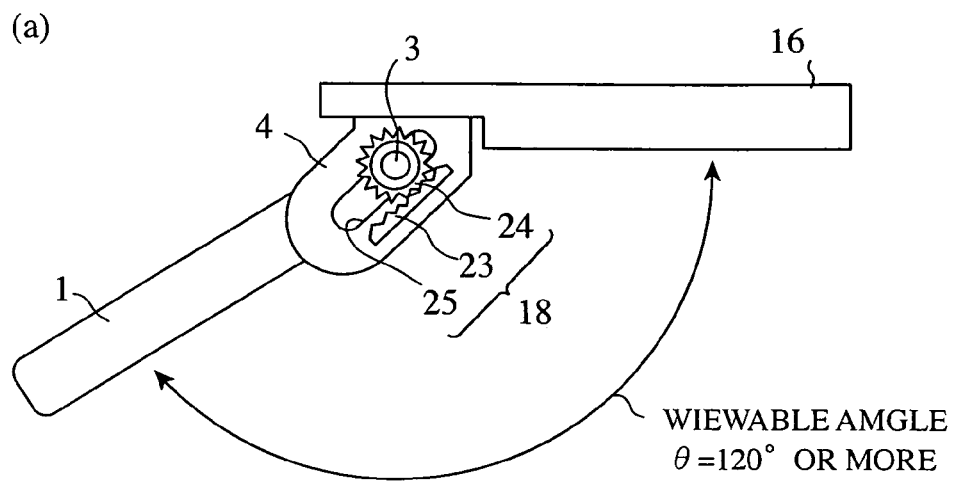
FIG. 7(a) is a schematic front view of the display and the rotating shaft moving means in a state of angle exceeding the viewable angle.
FIG. 7(b) is a schematic front view of the display and the members operating the switch in the state of angle exceeding the viewable angle.
Figure 7:
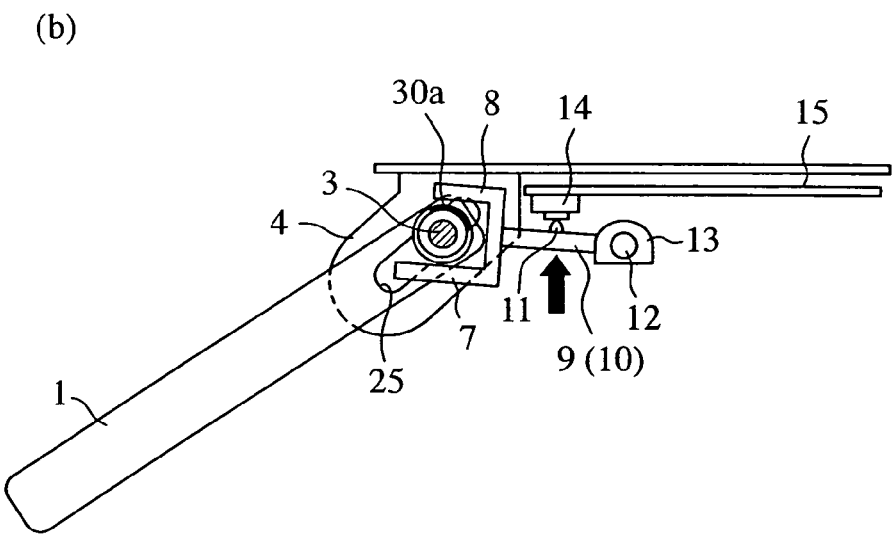

Finally, the display 1 is brought to the opened state as shown in FIG. 6, and shown in the full line in FIG. 1. In that state, the rotating shaft 3 has been displaced obliquely upward from the position thereof as shown in FIG. 4. Under the opened state of the display 1 as shown in FIG. 6, rotating the display 1 in an anti-clockwise direction enables the display 1 to return to the closed state as shown in FIG. 4.

It should be noted that there is a correlation between the rotating angle of the display 1 and the amount of shift or displacement of the rotating shaft 3. The condition of the gear is previously set such that, when the display 1 is rotated a predetermined angle from the closed state to the opened state, the rotating shaft 3 is obliquely upward displaced by a predetermined distance corresponding to the position where the lower end of the display 1 does not obstruct the driver's view.

Figure 8:
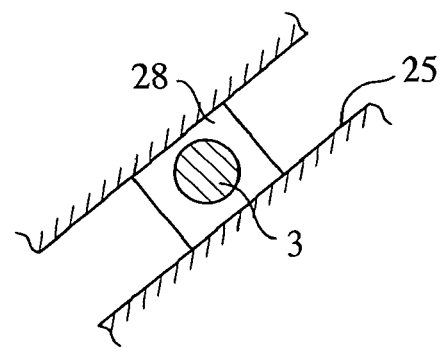
FIG. 8 is a view explaining a sliding piece existing in a guide slot.

In this connection, in order to stabilize the engagement of the rotating shaft 3 along the guide slot 25 and thereby, smoothly rotate and displace the rotating shaft, it may be possible to journal the rotating shaft 3 on a sliding piece 28 consisting of a rectangular block, for example, as shown in FIG. 8, and then, slidably fit the sliding piece 28 in the guide slot 25.

Figure 10:
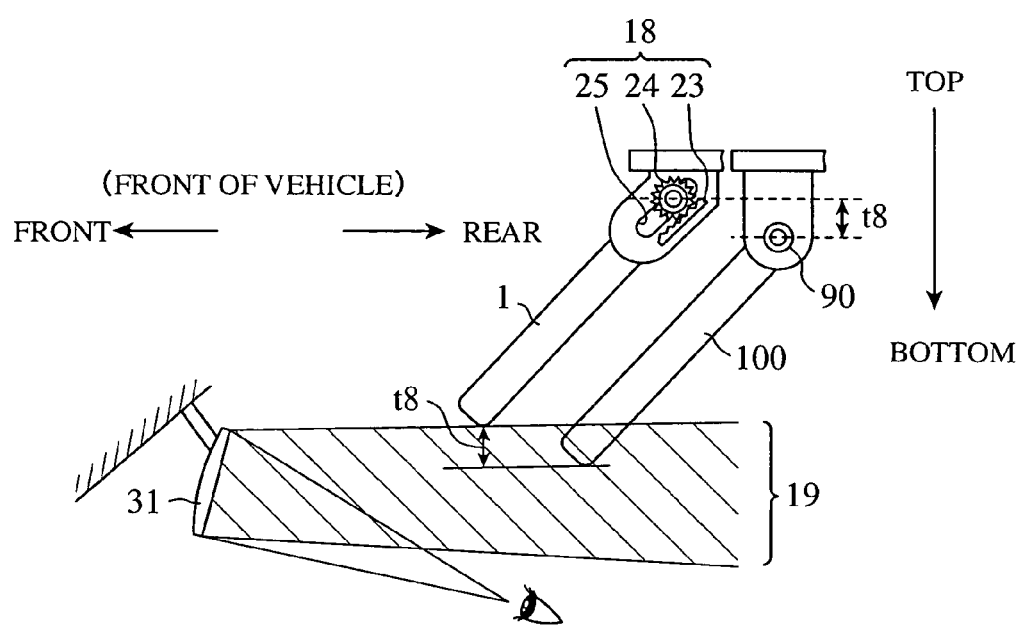
FIG. 10 is a view explaining the display according to the present invention by comparing the display with a conventional one.

The improvement of influence on the rearward visibility through a room mirror achieved by the rotating shaft moving means 18 according to the embodiment will be explained by referring to FIG. 10.

The display 1 is equipped with the rotating shaft moving means 18 including the pinion 24, guide slot 25, and rack 23 as mentioned above, and a display 100 that is of conventional type rotates with a fixed rotating shaft 90 as the fulcrum axis. When both those displays 1, 100 are in the opened state, the interval (the distance between the lower ends of the display 1 and the display 100) between the rotating shaft 3 and the rotating shaft 90 in a vertical direction is t8.

The conventional type display 100 impairs rearward visibility 19 through a room mirror 31 and blocks the rearward visibility by an amount of height t8; however the display 1 according to the embodiment does not block the rearward visibility 19, and exerts no influence on the visibility. In the embodiment, since the rotating shaft 3 in the stored state assumes a position lower than the position thereof in the opened state, a display having a considerable thickness is able to be placed on the position parallel to the ceiling on the level equal to that of the conventional-type.

According to the present invention, in the display having the above-described features, having a structure where the rotating shaft is vertically displaced, the opening/closing position of the display 1 is arranged to be detected not only when the display is at the stored position (i.e., in the closed state) but also when the display is at other opening/closing positions. The structure and the operation thereof will now be explained below.

FIG. 2 is a view illustrating by omitting the configuration of parts unnecessary for explanation for the purpose of describing a means detecting the opening/closing position of the display 1. FIG. 3 is a view of the display in completely the same state and having completely the same structure as that shown in FIG. 2, as shown with members partially ruptured for the purpose of the explanation. In those figures, the rotating shaft 3 is shown in a broken-out manner, and actually, the part of the rotating shaft extending to this side fits into the guide slot 25 of the rotating shaft holder 4.

Figure 9:
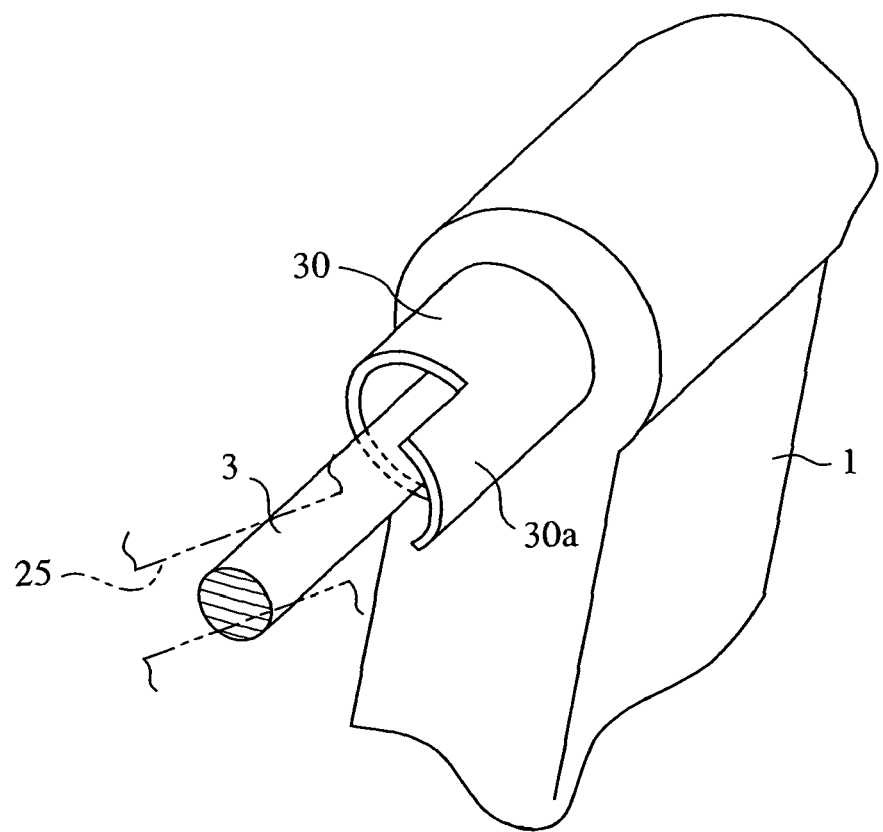
FIG. 9 is an oblique view of a cylinder shaft.

A cylinder shaft 30 that is coaxial and integral with the rotating shaft 3 and is larger in diameter than the rotating shaft 3 is disposed outside the display 1 and inside the rotating shaft holder 4. As shown in FIG. 9, the cylinder shaft 30 has a tip portion given the shape as is cut out with remaining a circularly arcuate protrusion 30a axially having a length, and the tip part thereof circumferentially constitutes a projecting and recessed, or irregularity part. The cylinder shaft 30 is a rotor having the projecting and recessed part that is vertically displaced and rotated, integrally with the rotating shaft 3. The protrusion 30a partially constitutes the projecting and recessed part, and is also called a projecting part.

Referring to FIG. 2, plate-shaped members each are positioned above and below across the projecting and recessed part. Of those plate-shaped members, the member positioned below is a projecting-and-recessed-part detector 7, and the member positioned above is a projecting-and-recessed-part detector 8. The projecting-and-recessed-part detector 7 is longer in the right-left direction than the projecting-and-recessed-part detector 8. Those projecting-and-recessed-part detector 7 and projecting-and-recessed-part detector 8 are connected with a connecting plate 6 between their tip potions to form a nearly U shape, and the protrusion 30a is located within the U shape.

One end of a projecting-and-recessed-part transmitting lever 9 is fixed on the middle part of the connecting plate 6. The other end of the projecting-and-recessed-part transmitting lever 9 is integral with a lever shaft 12, and the lever shaft 12 is journaled on a lever holder 13 that is integral with a cover member 17 covering a print-circuit board 15 fixed on a base plate 16. The projecting-and-recessed-part transmitting lever 9 can be swung with the lever shaft 12 as the fulcrum, and is pressed and moved by the protrusion 30a.

A switch pressing lever 10 is formed integrally with and in parallel with, the projecting-and-recessed-part transmitting lever 9. The length of the switch pressing lever 10 is nearly one-half that of the projecting-and-recessed-part transmitting lever 9 with the projecting-and-recessed-part transmitting lever 9 as the base-end side. As apparently shown in FIG. 3 where the projecting-and-recessed-part transmitting lever 9 and the switch pressing lever 10 are partially ruptured, a switch 14 is provided at the position opposed to the switch pressing lever 10 on the print-circuit board 15; however, the switch is not shown in FIG. 2 since the switch is hid by the projecting-and-recessed-part transmitting lever 9 and the switch pressing lever 10. Further, a protruding switch pressing part 11 is provided at the position opposed to the switch 14 on the switch pressing lever 10 (in FIG. 6(b) and so on).

It should be noted that the lever shaft 12 is arranged to, in the state where an external force does not act on the projecting-and-recessed-part detector 7 and the projecting-and-recessed-part detector 8 (for example, in the state where the protrusion 30a does not work thereon), return the switch pressing part 11 to a neutral position spaced from the switch 14. The information for turning on or turning off the switch 14 is a signal for control, which is used for controlling the display, and the signal for control is transmitted to the control part of the display to thereby turn on or turn off the power of the display 1 for displaying image information.

The process for detecting the opening/closing position of the display 1 carried out synchronously with the opening/closing operation of the display will be explained by referring to FIG. 4 to FIG. 7 hereinbelow. In each of those figures, (a) shows the relation between the operations of the rotating shaft moving means 18 and the opened/closed state of the display 1; (b) shows the relation between the opened/closed state of the display 1 and the operations of the rotating shaft 3, the protrusion 30a, the projecting-and-recessed-part detector 7, the projecting-and-recessed-part detector 8, the projecting-and-recessed-part transmitting lever 9, the switch pressing lever 10, and the switch 14; and in each of those figures, (a) corresponds to (b).

The display in the stored state is shown in FIG. 4(a), (b) The display 1 is in the stored state (the closed state), and the rotating shaft 3 is located in the lower end of the guide slot 25. The projecting-and-recessed-part detector 7 is pressed and moved by the right end (seen from the rotation center) of the protrusion 30a, to thereby rotate 3 the lever shaft 12 through the projecting-and-recessed-part transmitting lever. Since it is not possible that the display 1 is watched in the stored state, the switch 14 is turned on by pressing of the switch pressing part 11. The control part of the display 1, based on receiving that on-signal, maintains the display 1 in the off state.

The display in opening operation is shown in FIG. 5(a), (b). The display 1 is now rotated approximately 60° from the stored state (closed state). The rotating shaft 3 is located at the midpoint position of the guide slot 25. The projecting-and-recessed-part detector 7 is spaced from the protrusion 30a, and thereby, the switch pressing part 11 is returned to a neutral position separated from the switch 14 and maintained at the position. The switch 14 is turned off during the display's rotating operation. The control part of the display 1, receiving that off-signal, maintains the display 1 in the on-state (the state where the display can be watched) since it is possible that the display 1 is watched even during the display's opening operation, to be more exact, even in a halfway state not reaching the regular viewable state rated as the most desired state in design.

The display in the viewable state is shown in FIG. 6(a), (b). The display 1 is in the regular viewable state (The viewable angle θ=120 degrees. θ: the angle formed between the base plate 16 and the display 1), and the angle is suitable for watching the display 1. The rotating shaft 3 is located at the upper position of the guide slot 25; however, for protection against excess rotation, a clearance is arranged at the upper part of the guide slot 25 for ensuring the state where the display is opened exceeding the viewable angle. The protrusion 30a is in a state immediately before coming in contact with the projecting-and-recessed-part detector 8. Therefore, the switch pressing part 11 is returned to the neutral position separated from the switch 14 and maintained at the position. The switch 14 is turned off when the display 1 is in the viewable state. The control part of the display 1, receiving that off-signal, maintains the display 1 in the on-state (the state where the display can be watched) during the display 1 being in the viewable state.

The display in the state of angle exceeding the viewable angle is shown in FIG. 7(a), (b). When the display 1 is maintained at the regular viewable angle, an occupant occasionally comes in contact with the display 1. Even in such a case, the display 1 is furthermore opened, to say more precisely, the display is allowed to be excessively rotated, and thereby, the occupant is arranged to receive reduced shock to be prevented from the shock. When the angle θ formed between the base plate 16 and the display 1 exceeds the angle 120 degrees that is suitable for watching the display, the protrusion 30a presses and moves the projecting-and-recessed-part detector 8 to rotate the lever shaft 12 through the projecting-and-recessedpart transmitting lever 9. Thereby, the switch 14 has been turned on by being pressed by the switch pressing part 11. The control part of the display 1, receiving that on-signal, maintains the display 1 in the off-state.

In the state of angle exceeding the viewable angle, the display 1 rotates moreover from the position shown in full line in FIG. 1 in the direction indicated by the arrow. For this reason, the display 1 sometimes directly comes within the driver's sight. Therefore, it is arranged that the display 1 be turned off so as not to distract the driver's attention.

Thus, since it is arranged that at a plurality of rotation positions of the cylinder shaft 30 that is the rotor, to be more specific, at a plurality of rotation positions of the protrusion 30a, the projecting-and-recessed-part transmitting lever 9 and the switch pressing lever 10 be controlled, the switch 14 is able to be turned on not only at the stored position, but also in the state of angle exceeding the viewable angle. Moreover, since the signal for controlling the display is the on/off signal of the power of the display for displaying information on its screen, a disincentive to the concentration of attention on driving acting on the driver because of the display's getting within the driver's sight can be reduced by turning off the display 1.

INDUSTRIAL APPLICABILITY

The present invention is able to be widely applied to hold mechanisms of on-vehicle AV devices such as liquid-crystal televisions, car navigation devices, or the equivalent mounted on ceilings of vehicles or the like.

The invention claimed is:

1. A display opening and closing angle detecting mechanism comprising:
    a display mounted on a ceiling of a vehicle, and rotating in an opening or closing direction with a rotating shaft as a fulcrum integrally with the rotating shaft;
    a supporting means for supporting the rotating shaft;
    a rotating shaft moving means for displacing the rotating shaft vertically to the supporting means the according to the rotation of the display;
    a rotor having a projecting and recessed part that is displaced vertically and rotates, integrally with the rotating shaft;
    a lever pressed and moved at a plurality of rotation positions of the rotor by the projecting and recessed part; and
    a switch operating according to the movement of the lever to send a signal for controlling the display.

2. The display opening and closing angle detecting mechanism according to claim 1, wherein the plurality of rotation positions of the rotor include a position where the display is in the stored state and a position where the display is opened exceeding a viewable angle of the display.

3. The display opening and closing angle detecting mechanism according to claim 1, wherein the signal for controlling the display is for turning on or turning off the power of the display for displaying information on its screen.

* * * * *